United States Patent

Wieser et al.

[11] Patent Number: 6,036,838
[45] Date of Patent: Mar. 14, 2000

[54] METHOD FOR DETERMINING THE SUBSTANCE CONVERSION DURING ELECTROCHEMICAL REACTIONS AND ELECTROCHEMICAL UNIT

[75] Inventors: Christian Wieser, Kirchheim; Axel Helmbold, Stuttgart, both of Germany

[73] Assignee: Deutsches Zentrum fuer Luft -und Raumfahrt e.V., Bonn, Germany

[21] Appl. No.: 09/357,342

[22] Filed: Jul. 14, 1999

Related U.S. Application Data

[63] Continuation of application No. PCT/EP98/07247, Nov. 12, 1998.

[30] Foreign Application Priority Data

Nov. 15, 1997 [DE] Germany .......................... 197 50 738

[51] Int. Cl.[7] .................................................. C25B 1/00
[52] U.S. Cl. .................... 205/339; 205/335; 204/252; 204/279; 204/280; 204/286; 204/287; 429/7; 429/10; 429/90
[58] Field of Search .................................. 205/335, 339, 205/343; 204/279, 280, 286, 287, 252; 429/10, 90, 7

[56] References Cited

U.S. PATENT DOCUMENTS

| | | | |
|---|---|---|---|
| 3,493,436 | 2/1970 | Johnsen | 429/10 |
| 3,597,278 | 8/1971 | Brimes | 429/10 |
| 3,885,212 | 5/1975 | Herbert | 324/117 H |
| 4,972,140 | 11/1990 | Okazaki et al. | 324/117 H |

FOREIGN PATENT DOCUMENTS

| | | |
|---|---|---|
| 0 431 565 | 6/1991 | European Pat. Off. |
| 55 122889 | 9/1980 | Japan. |
| 04 238281 | 8/1992 | Japan. |
| 05 106076 | 4/1993 | Japan. |
| 522 039 | 4/1972 | Switzerland. |

OTHER PUBLICATIONS

*Patent Abstracts of Japan*, Abstract of Japanese Patent No. 55 122889, "Detecting Method of Current In Electrolytic Refining of Metal", vol. 4, No. 182, Dec. 16,
*Patent Abstracts of Japan*, Abstract of Japanese Patent No. 04 238281, "Electrochemical Reaction Measuring Device", vol. 17, No. 7, Jan. 7, 1993.
*Patent Abstracts of Japan*, Abstract of Japanese of Patent No. 05 106076, "Method for Inspecting Electrolytic Cell", vol. 17, No. 458, Aug. 20, 1993.

*Primary Examiner*—Bruce F. Bell
*Attorney, Agent, or Firm*—Barry R. Lipsitz

[57] ABSTRACT

In order to improve a method for determining the substance conversion during areal electrochemical reactions in at least one local surface area between a counterelectrode arrangement of an areal design and an electrode arrangement of an areal design, which has a contact element segment designed in accordance with the surface area and a contact element contacting the remaining surface areas and being electrically insulated in relation to the contact element segment, in such a manner that the substance conversion can be determined in as simple a manner as possible it is suggested that not only the contact element but also the contact element segment be connected to one current source or current drain provided for carrying out the electrochemical reaction, that a current flowing between the contact element segment and the current source or current drain via a conductor generate a magnetic field around the conductor and that the magnetic field be determined as a measure for the substance conversion in the local surface area.

24 Claims, 4 Drawing Sheets

METHOD FOR DETERMINING THE SUBSTANCE CONVERSION DURING ELECTROCHEMICAL REACTIONS AND ELECTROCHEMICAL UNIT

The present disclosure relates to the subject matter disclosed in International Application No. PCT/EP98/07247 (WO 99/26305) of Nov. 12, 1998, the entire specification of which is incorporated herein by reference.

This application is a continuation of international application No. PCT/EP98/07247, filed Nov. 12, 1998.

BACKGROUND OF THE INVENTION

The invention relates to a method for determining the substance conversion during areal electrochemical reactions in at least one local surface area between a counterelectrode arrangement of an areal design and an electrode arrangement of an areal design which has a contact element segment designed in accordance with the surface area and a contact element contacting the remaining surface areas and being electrically insulated in relation to the contact element segment.

Areal reactions are to be understood, for example, as electrolytic reactions or also reactions in fuel cells or batteries or accumulators.

It is known from the state of the art to connect the contact element segment and the contact element contacting the remaining surface areas to separate current sources or current drains for determining the substance conversion in the local surface area and thus open up the possibility of detecting the substance conversion in this local surface area independently of the substance conversion in the remaining surface areas and defining it via the flow of current.

This solution is, however, only practicable when a determination of the substance conversion during the areal electrochemical reaction is intended to take place in one, possibly two surface areas.

In addition, the provision of several current sources or several current drains has disadvantages when the same conditions are intended to be present not only in the contact element segment but also in the rest of the contact element.

The object underlying the invention is therefore to improve a method of the generic type in such a manner that the substance conversion can be determined in as simple a manner as possible.

SUMMARY OF THE INVENTION

This object is accomplished in accordance with the invention, in a method of the type described at the outset, in that not only the contact element but also the contact element segment are connected to one current source or current drain provided for carrying out the electrochemical reaction, that a current flowing between the contact element segment and the current source or current drain via a conductor generates a magnetic field around the conductor and that the magnetic field is determined as a measure for the substance conversion in the local surface area.

The advantage of the inventive solution is to be seen in the fact that not only the contact element segment but also the rest of the contact element are supplied by one and the same current source or current drain and that, as a result, essentially the same boundary conditions are present for the supply of the contact element segment and the rest of the contact element. In this respect, the contact element can be designed in the customary manner and extend over the remaining surface areas, or the contact element can, for its part, comprise additional contact element segments.

In addition, it is provided in accordance with the invention for the current flowing via the conductor leading to the contact element to be measured in a particularly simple manner and free of interruption for the electrochemical reaction, namely via the magnetic field which forms around the conductor and which thus makes a measurement of the current possible without any intervention in the current supply to the contact element segment itself.

Furthermore, the inventive solution is also of advantage because in the case of areal electrochemical reactions very high currents generally occur and thus the interposition of so-called "shunt resistors" would cause considerable problems whereas the inventive measurement of the magnetic field forming around the conductor can be carried out very simply and without any problem without any additional intervention in the current supply needing to be made.

A solution, with which the conductor extends in one direction and the magnetic field surrounding the conductor azimuthally to this direction is determined, is particularly advantageous.

The magnetic field may be determined in the most varied of ways. One advantageous solution, for example, provides for the magnetic field to be determined by means of an electric magnetic field sensor.

With respect to the design of such a magnetic field sensor, the most varied of sensor solutions are conceivable. A particularly advantageous and preferred solution with respect to its sensitivity provides for a Hall sensor to be used as magnetic field sensor.

In order to guide the magnetic field in as narrow a space as possible and thus be able to measure as large a magnetic flux as possible by means of the magnetic field sensor, it is preferably provided for the magnetic field to be guided through a magnetic field-guiding element.

The element guiding the magnetic field is preferably designed such that it at least partially surrounds the conductor azimuthally.

Thus, not only a guidance of the magnetic field but a screening effect going beyond the element guiding the magnetic field can be achieved at least in that area, in which the element guiding the magnetic field surrounds the conductor.

It is particularly favorable when the element guiding the magnetic field ends on both sides of the magnetic field sensor and thus not only a concentration of the magnetic field is caused to the effect that this flows through the magnetic field sensor to the greatest extent but also a screening of the field.

In this respect, it is particularly favorable when the element guiding the magnetic field is provided with a gap, in which the magnetic field sensor is arranged.

The element guiding the magnetic field has an optimum effect when this is selected from a magnetically soft material. It is particularly favorable when the element guiding the magnetic field is formed from a ferrite material.

A solution which is advantageous, in particular, for a stacking of electrode and counterelectrode arrangements provides for the conductor to be arranged within an electrode holder and thus for a measurement of the magnetic field for determining the current and thus the substance conversion, as well, to be carried out within the electrode holder.

In addition, the object cited at the outset is also accomplished in accordance with the invention, in the case of an electrochemical unit comprising a chemical reaction unit, in which an areal chemical reaction occurs, and a counterelectrode arrangement of an areal design abutting on the reaction unit on the one side as well as an electrode arrangement of an areal design which abuts on the reaction unit on the other side and which has a contact element segment designed in accordance with a local surface area of the reaction unit and contacting it and a contact element contacting the remaining surface areas of the reaction unit and being electrically insulated in relation to the contact element segment, in that not only the contact element but also the contact element segment are connected to one current source or current drain provided for carrying out the electrochemical reaction, that the contact element segment is connected to the current source or current drain via a conductor, that a current flowing via the conductor between the contact element segment and the current source or current drain generates a magnetic field around the conductor and that the magnetic field can be determined as a measure for the substance conversion in the local surface area by means of a magnetic field sensor.

The advantage of this solution is likewise to be seen in the fact that a possibility has been created of determining the local substance conversion in the reaction unit in a simple manner, in particular, without intervening in the system itself.

The conductor is preferably designed such that it extends in one direction and that the magnetic field extending around this direction azimuthally can be determined with the magnetic field sensor.

In principle, it would be conceivable to measure the magnetic field propagating around the conductor in the free space. However, in order to bring about as great a flow-through of the magnetic field sensor as possible, it is preferably provided for the magnetic field to pass through an element guiding the magnetic field so that, as a result, the magnetic flow-through of the magnetic field sensor can be selected to be as large as possible.

A particularly favorable solution provides for the element guiding the magnetic field to at least partially surround the conductor azimuthally so that, as a result, not only a guidance of the magnetic field but also a screening of the magnetic field against any wide-area flux leakage is possible.

In this respect, the element guiding the magnetic field is preferably designed such that it ends on both sides of the magnetic field sensor in order to use as large a proportion of the magnetic field as possible for flowing through the magnetic field sensor.

A particularly favorable solution provides for the element guiding the magnetic field to have a gap, in which the magnetic field sensor is arranged.

A particularly favorable embodiment of the element guiding the magnetic field provides for this to be of an approximately C-shaped design, wherein the C shape defines an angular basic form or a rounded basic form. In the most favorable case, the C-shaped design of the element guiding the magnetic field leads to this being designed as a ring or yoke with a radial annular gap or yoke gap.

With respect to the material for the element guiding the magnetic field, no further details have so far been given. One particularly favorable solution provides for the element guiding the magnetic field to be produced from a magnetically soft material. Such a magnetically soft material can, for example, be a material such as that used for transformer sheets.

It is even more advantageous when the element guiding the magnetic field is formed from a ferrite since this exerts an even greater guiding function on the magnetic field.

In order to make installation in a stack-like or a stacked system possible with the inventive solution it is preferably provided for an electrode holder of the electrode arrangement to be designed such that the conductor which leads to the contact element segment is arranged in it.

In this respect, the conductor is preferably arranged on an electrode holder plate or the contact element segment and projects from it.

In order to be able to carry out a measurement of the magnetic field in a suitable manner in the case of the arrangement of the conductor in the electrode holder, it is preferably provided for the conductor to be surrounded in the electrode holder by a space.

In this respect, when an element guiding the magnetic field is provided this is preferably arranged in the space. With this solution it is possible to measure the magnetic field within the electrode holder, namely the magnetic field of the current which leads from an electrode holder plate to the contact element segment.

In this respect, the conductor is preferably designed like a pin. One embodiment provides for the pin-like conductor to be integrally formed on an electrode holder plate or the contact element system.

In order to provide an operative connection between the contact element segment and the pin serving as conductor in a suitable manner, it is preferably provided for the pin-like conductor to be supported on a rear side of the contact element segment and thus be connected to this in an electrically conductive manner.

With respect to the filling of the space existing around the conductor in the electrode holder, no further details have so far been given. This could, for example, also remain as a hollow space. However, a particularly favorable solution provides for this—insofar as it is not filled by the magnetic field sensor or the element guiding the magnetic field—to be filled by a material which is electrically non-conductive and does not influence the magnetic field so that no undesired hollow spaces whatsoever result in the electrode holder.

This material is preferably provided at the same time as electrically insulating material between the contact element segment and the rest of the contact element.

A particularly favorable solution provides for this material to be a plastic material, preferably silicone.

BRIEF DESCRIPTION OF THE DRAWINGS

Additional features and advantages of the invention are the subject matter of the following description as well as the drawings illustrating several embodiments.

Figure 1:
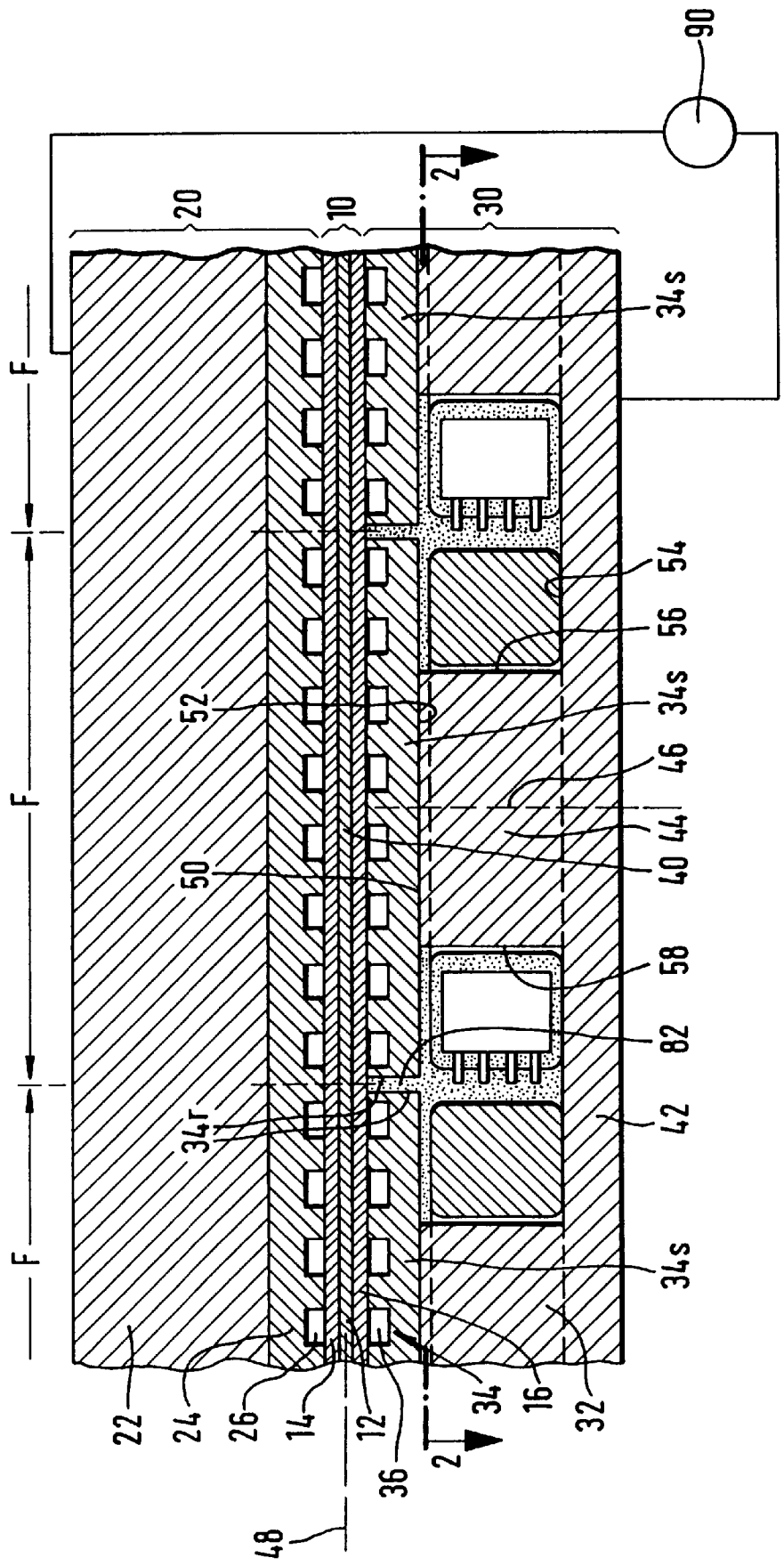
FIG. 1 shows a longitudinal section through a first embodiment of a fuel cell representing an electrochemical unit.
Figure 2:
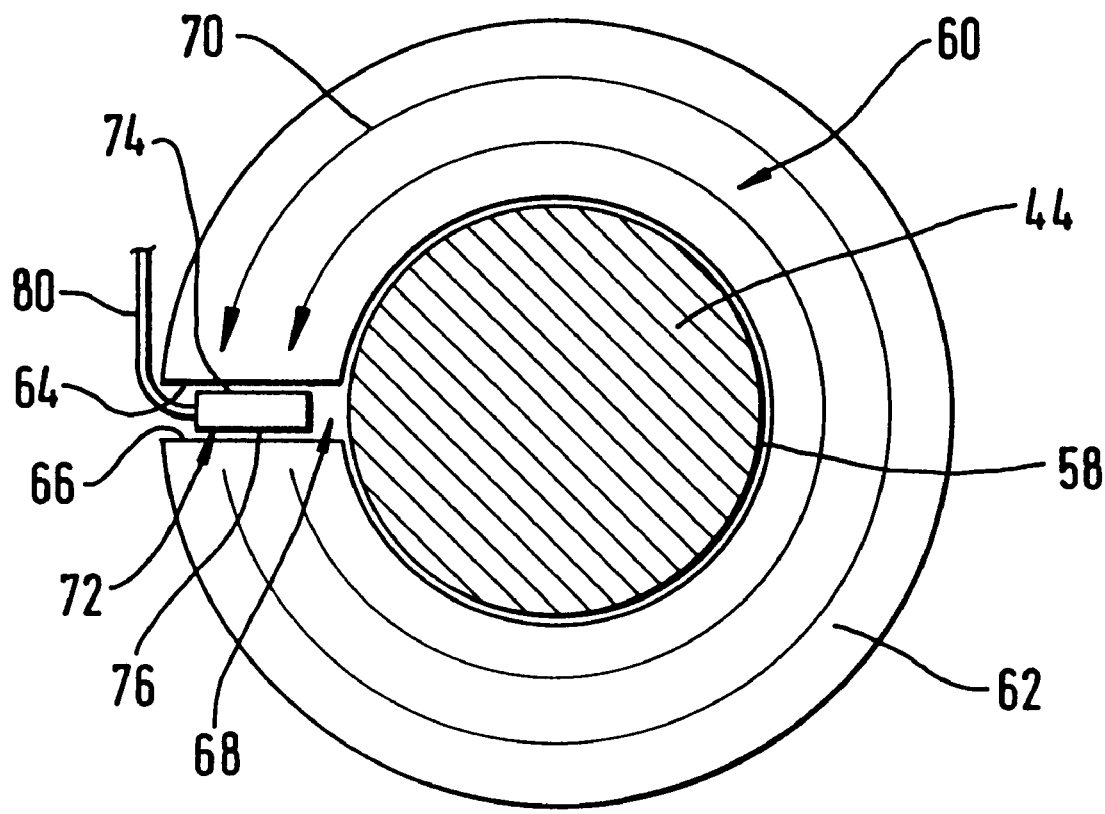
FIG. 2 shows a section along line 2—2 in FIG. 1.

A fuel cell as example for an inventive electrochemical unit, a detail of which is illustrated in FIG. 1, comprises a reaction unit which is designated as a whole as 10 and, in the case of the fuel cell, has a membrane 12 which is provided on both sides with layers 14 and 16 which comprise a catalyst material and conductive, so-called electrode material, wherein these layers 14 and 16 consisting of electrode material and catalyst material are permeable to gas.

The reaction unit 10 is in contact, on the one hand, with a counterelectrode arrangement 20 which has a counterelectrode holder 22 and a gas distributor element as contact element 24, wherein the gas distributor element contacts the layer 14 and at the same time has gas channels 26 which face the layer 14 and via which the layer 14 permeable to gas can be supplied with the respective gas required for the reaction. These gas channels 26 are connected to an external gas supply, not illustrated in FIG. 1.

In addition, the reaction unit 10 is in contact with an electrode arrangement 30 which has an electrode holder 32 and abuts on the layer 16 with a contact element 34 which is likewise designed as a gas distributor element and has gas channels 36 which face the layer 16 and via which a supply of gas to the layer 16 permeable to gas is possible. The gas channels 36 are likewise connected again to an external gas supply.

The contact element 34 is, however, formed from various contact element segments 34s which are respectively allocated to defined surface areas 40 of the reaction unit 10 having approximately a corresponding extension, wherein each of the surface areas 40, for example, in the sectional plane illustrated in FIG. 1, has the extension F.

For the contacting of the contact element segments 34s, the electrode holder 32 has a so-called electrode holder plate 42, from which projections 44 project which extend in the direction of the contact element segments 34s, are of a cylindrical design in cross section and represent an electrical conductor, the cylinder axis 46 of these projections extending essentially transversely to a plane 48, in which the reaction unit 10 extends and parallel to which the contact element segments 34 also extend, wherein the projections 44 abut with their end face 50 facing the contact element segments 34 on a rear side 52 of the contact element segments 34 facing away from the reaction unit 10, thereby forming an electrically conductive connection.

The projections 44 thus represent an electrical conductor for the guidance of a current between the contact element segments 34 and the electrode holder plate 42.

Due to the fact that the projections 44 which are cylinder-shaped in cross section project beyond a side of the electrode holder plate 42 facing the contact element 34 in the direction of the contact element segments 34, a space 56 is formed around the cylinder-shaped projections 44 and between the rear side 52 of the contact element segments 34 as well as the side 54 of the electrode holder plate 42, this space surrounding the projection 44 adjacent to its cylinder casing surface 58.

An element 60 guiding a magnetic field is provided in the space 56 and this is designed, for example, as an annular member 62, wherein ends 64 and 66 of the annular member do not merge into one another so that the annular member 62 is closed but are arranged at a distance from one another and form a gap 68 between them.

The element 60 guiding a magnetic field is preferably formed from any type of magnetically soft material, in particular, from ferrite and concentrates a magnetic field 70 which is formed around the cylindrical projection 44 designed as electrical conductor, extending around the cylinder axis 46, when the projection has a current passing through it in the direction of the cylinder axis 46.

In order to measure the magnetic field 70, a magnetic field sensor designated as a whole as 72, preferably a Hall sensor, is provided in the gap 68 and its flat sides 74, 76 face the ends 64, 66 so that the magnetic field 70 flows through the Hall sensor 72 transversely to its flat sides 74, 76.

The projection 44 cylinder-shaped in cross section preferably has as cylinder casing surface 58 a casing surface 58 which is of a circular-cylindrical shape in relation to the cylinder axis 46 but it is, however, also conceivable to select all possible cross-sectional shapes for the cylindrical projection 44.

Connection lines 80 leading to the Hall sensor 72 are guided to the outside out of the electrode holder 32 via the spaces 56 present around the respectively adjacent projections 44.

For the purpose of sealing between the individual contact element segments 34s, a sealing mass 82, preferably silicone, is provided between the edges 34r thereof facing one another and seals the contact element segments 34s in relation to one another. The sealing mass 82 serves, in addition, for embedding the elements 60 guiding the magnetic field and the Hall sensors 72 as well as the lines 80.

Figure 3:
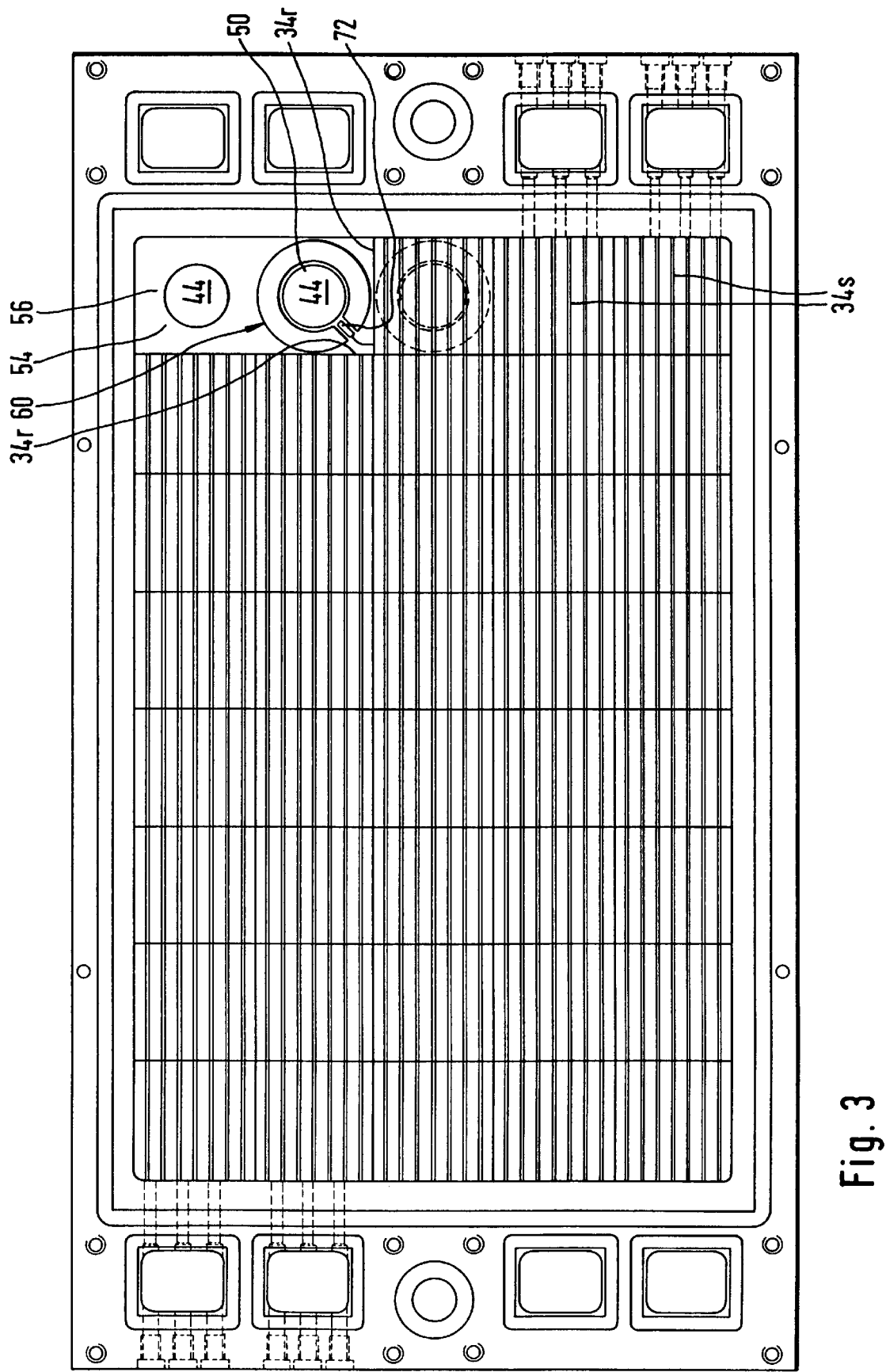
FIG. 3 shows a plan view of the electrode arrangement of the first embodiment, wherein at the top right in the region of a first contact element segment which is not illustrated only the conductor and the electrode holder plate are illustrated, in the region of the contact element segment located below this the conductor with the element guiding the magnetic field and surrounding the conductor and the magnetic field sensor are indicated and in the region of the contact element segment located even further below this the conductor and the element guiding the magnetic field are indicated while, as for the rest, only the contact element segments are visible.

If, as illustrated, for example, in FIG. 3, the entire electrode arrangement 30 is formed from a plurality of contact element segments 34s, the electrode holder 32 is provided with a plurality of cylindrical projections 44 projecting beyond its side 54 facing the reaction unit so that the space 56, in which the elements 60 guiding the magnetic field can be arranged with the magnetic field sensors 72, is available around the cylindrical projections 44. This entire space 56 is filled, in addition, with the sealing mass 82 after insertion of the units 60 guiding the magnetic field and the magnetic field sensors 72. Furthermore, the individual contact element segments 34s are placed on the cylindrical projections 44 acting as conductors so that they are in electrical contact with the respective end face 50 of the projections 44 with their rear side 52.

By measuring the magnetic fields 70 respectively forming around the cylindrical projections 44 by means of the magnetic field sensors 72, it is possible to measure the current flowing to each individual contact element segment 34s and to conclude from this current the substance conversion in the surface area 40 corresponding to the respective contact element segment 34s.

In the case of a fuel cell, the counterelectrode holder 22 and the electrode holder 32 are, for example, connected to a current drain 90, to which the current resulting due to the chemical reaction in the reaction unit 10 flows. The unit consisting of reaction unit 10 as well as counterelectrode arrangement 20 and electrode arrangement 30 can, however, be built up in a multiple manner in the form of a stack so that the current drain is only then connected via the electrochemical units stacked on top of one another.

Figure 4:
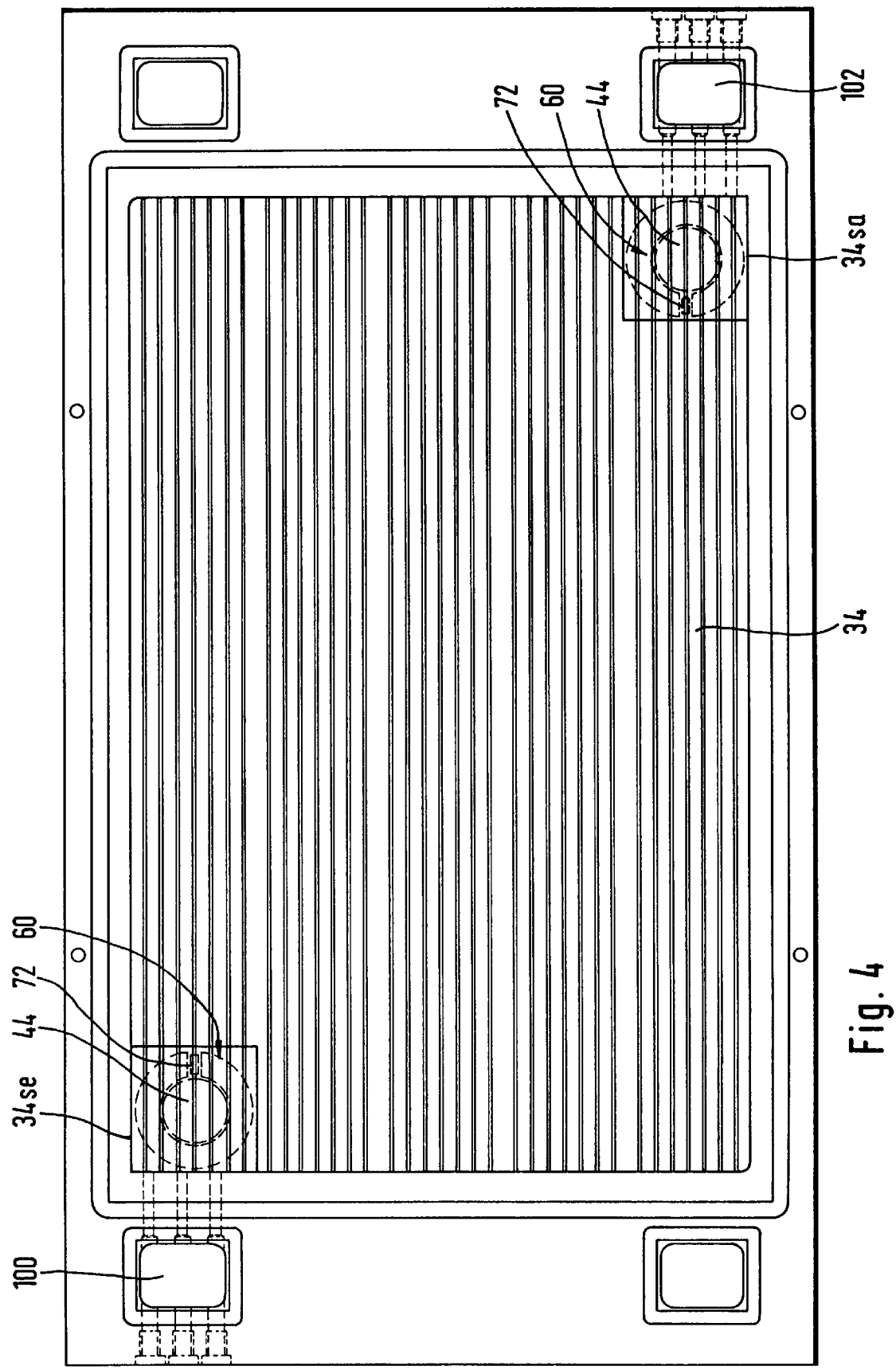
FIG. 4 shows a plan view of a second embodiment of an inventive electrode arrangement which merely has two contact element segments which are arranged so as to be electrically insulated in relation to the rest of the contact element.

In another use of the inventive solution in a fuel cell, illustrated in FIG. 4, only one contact element segment 34se located close to a gas inlet 100 and one contact element 34sa located close to a gas outlet 102 are designed to be separated electrically from the rest of the contact element 34 and connected electrically to the electrode holder plate 44 via a conductor 44 of the electrode holder 32, wherein current is likewise measured again with the element 60 guiding the magnetic field and an associated magnetic field sensor 72 and this measurement allows conclusions to be drawn concerning the substance conversion in the surface area 40 located opposite the respective contact element segment 34se, 34sa.

Since an analysis of the substance conversion in a surface area of the reaction unit 10 in the vicinity of the gas inlet 100 and of the substance conversion in a surface area 40 in the vicinity of the gas outlet 102 allows extensive information to be gathered concerning the effectiveness of the reaction unit 10 of this one unit, data concerning the functioning of the entire reaction unit 10 of a single electrochemical unit can already be obtained with two measurements of the substance conversion.

What is claimed is:

1. A method for determining a measure of substance conversion during electrochemical reactions in at least one local surface area between an extending counterelectrode structure and an extending electrode structure, comprising the steps of:

providing said electrode structure with a contact element segment designed in accordance with said local surface area and a contact element contacting remaining surface areas and being electrically insulated with respect to said contact element segment;

connecting both said contact element and said contact element segment to one current source or current drain provided for carrying out an electrochemical reaction, wherein a current flowing between the contact element segment and the current source or current drain via a conductor generates a magnetic field around the conductor; and determining said magnetic field for use as a measure of the substance conversion in said local surface area.

2. A method as defined in claim 1, wherein:

said conductor extends in a first direction, and the magnetic field determined during said determining step surrounds the conductor azimuthally to said first direction.

3. A method as defined in claim 1, wherein an electric magnetic field sensor is used to determine said magnetic field during said determining step.

4. A method as defined in claim 1, wherein said magnetic field is guided through a magnetic field-guiding element.

5. A method as defined in claim 4, wherein said magnetic field-guiding element at least partially surrounds said conductor azimuthally.

6. A method as defined in claim 4, wherein:

an electric magnetic field sensor is used to determine said magnetic field during said determining step; and said magnetic field-guiding element has ends adjacent two sides of the magnetic field sensor.

7. A method as defined in claim 4, wherein said magnetic field-guiding element comprises a magnetically soft material.

8. A method as defined in claim 1, comprising the further step of arranging said conductor within an electrode holder.

9. An electrochemical unit comprising:

a reaction unit, an extending counterelectrode structure abutting on one side of the reaction unit, an extending electrode structure abutting on another side of the reaction unit, said electrode structure having (i) a contact element segment designed in accordance with a local surface area of the reaction unit and contacting said local surface area, and (ii) a contact element contacting remaining surface areas of the reaction unit and being electrically insulated with respect to the contact element segment, the contact element and the contact element segment being adapted for connection to a current source or current drain provided for carrying out an electrochemical reaction in said reaction unit, the contact element segment being connected to the current source or current drain via a conductor, whereby a current flowing via the conductor between the contact element segment and the current source or current drain will generate a magnetic field around the conductor, and a magnetic field sensor for determining said magnetic field as a measure of substance conversion at the local surface area of said reaction unit.

10. An electrochemical unit as defined in claim 9, wherein:

said conductor extends in a first direction, and said magnetic field extends azimuthally around the first direction.

11. An electrochemical unit as defined in claim 9, wherein the magnetic field passes through an element guiding the magnetic field.

12. An electrochemical unit as defined in claim 11, wherein the element guiding the magnetic field at least partially surrounds the conductor azimuthally.

13. An electrochemical unit as defined in claim 11, wherein the element guiding the magnetic field has ends adjacent two sides of the magnetic field sensor.

14. An electrochemical unit as defined in claim 13, wherein the element guiding the magnetic field has a gap in which the magnetic field sensor is arranged.

15. An electrochemical unit as defined in claim 11, wherein the element guiding the magnetic field comprises a magnetically soft material.

16. An electrochemical unit as defined in claim 11, wherein the element guiding the magnetic field is formed from a ferrite.

17. An electrochemical unit as defined in claim 9 further comprising an electrode holder for the electrode structure, wherein the conductor leading to the contact element segment is arranged in the electrode holder.

18. An electrochemical unit as defined in claim 17, wherein the conductor is arranged on and projects beyond one of an electrode holder plate and said contact element segment.

19. An electrochemical unit as defined in claim 17, wherein the conductor is surrounded in the electrode holder by a space.

20. An electrochemical unit as defined in claim 19, wherein the element guiding the magnetic field is arranged in said space.

21. An electrochemical unit as defined in claim 9, wherein the conductor is a pin-shaped conductor.

22. An electrochemical unit as defined in claim 21, wherein the pin-shaped conductor is integrally formed on one of an electrode holder plate and said contact element.

23. An electrochemical unit as defined in claim 21, wherein the pin-shaped conductor is supported on a rear side of the contact element segment.

24. An electrochemical unit as defined in claim 9, wherein:

said conductor is surrounded in an electrode holder by an annular space, and said annular space is filled with an electrically non-conductive material that does not influence the magnetic field.

* * * * *